No. 727,184. Patented May 5, 1903.

UNITED STATES PATENT OFFICE.

ROBERT McKNIGHT AND MOSES SATARASKY, OF PHILADELPHIA, PENNSYLVANIA; SAID SATARASKY ASSIGNOR TO FINLEY ACKER, OF PHILADELPHIA, PENNSYLVANIA.

METHOD OF TREATING REFRACTORY ORES.

SPECIFICATION forming part of Letters Patent No. 727,184, dated May 5, 1903.

Application filed November 21, 1901. Serial No. 83,120. (No specimens.)

*To all whom it may concern:*

Be it known that we, ROBERT MCKNIGHT and MOSES SATARASKY, citizens of the United States, residing at Philadelphia, in the county of Philadelphia and State of Pennsylvania, have invented new and useful Improvements in the Art of Treating Refractory Ores, of which the following is a specification.

Our invention relates to the extraction of metals from ores containing metalloids in cases where a chlorination of the entire body of the ore is not desirable, either on account of the greater facility or less expense of producing simply an oxidation without chlorination of the ore or for some other reason making a chlorination less desirable.

It consists, essentially, in chloridizing the escaping precious or other metal values that it is desired to secure and which pass over to a greater or less extent with the fumes of the oxid of the metalloid in a receptacle in which is contained an aqueous solution of a chlorid of an alkaline or alkaline-earth metal, such as will be decomposed by the acid formed by the fumes of the metalloid coming into the solution. The alkaline or alkaline-earth metal will displace the hydrogen of the acid and set free the chlorin in a nascent state and will then allow the latter to combine with the particles of the metal value carried over and reduce them to chlorids.

Describing now the best method of which we are at present aware, giving the details of such best method, the ore containing the refractory metalloid is placed in a furnace and is subjected to a heat sufficient with access of air to produce an oxidizing roast, no particular attention being paid to keeping the roast at a low temperature. During this roast the refractory metalloids are oxidized and pass off in great part, and as they pass off they carry with them, whether chemically or otherwise is not readily determinable, almost all the metal that exists in the ore in a finely-divided state, especially if the mass of the ore is in a finely-divided state and agitated. This operation is preferably performed in an apparatus that will enable it to be kept completely away from the fumes of combustion and into which the air to produce the oxidation is freely admitted and the fumes arising from the ore are freely carried off, but carried off apart from the fumes of combustion, and are led into the receptacle where the second part of our operation is carried on. In this receptacle is placed common salt or other chlorid of an alkaline or alkaline-earth metal. This chlorid is dissolved in the water. The former is preferable, as will appear. As the fumes of the metalloid enter the water an acid of the metalloid will be formed, such as sulfuric, sulfurous arsenic, or telluric acid. This will react with the chlorid of the solution with the formation of a salt of the metalloid and the alkaline or alkaline-earth metal, the chlorin being set free in a nascent state and combining with the precious metal or other metal that has come over from the furnace to form a chlorid. The separation of the different materials in the receptacle is very readily accomplished, the hydrogen escapes as a gas, the oxysalt of the alkaline metal is stable and is precipitated, the chlorid of the precious metal, if gold, remains in solution, and, if silver, precipitates as horn silver, and the other metals will take corresponding forms. The metals in solution can simply be decanted, and those precipitated as chlorids are all very readily volatilized and separated in that manner, as their temperature of volatilization is very much lower than any of the other precipitated materials. As an example of an instance of this reaction we will take a common ore—such, for instance, as a sulfid ore of an ordinary description containing gold and silver in a flour state. The sulfur will come into the receptacle containing the solution of chlorid of lime as sulfuric anhydrid or sulfurous anhydrid, principally the former, and there will form sulfuric acid, taking the reaction from this state

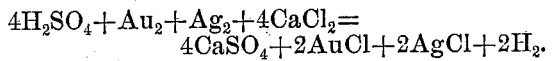

$$4H_2SO_4 + Au_2 + Ag_2 + 4CaCl_2 = 4CaSO_4 + 2AuCl + 2AgCl + 2H_2.$$

The hydrogen passes off, the auric chlorid remains in solution, the silver chlorid precipitates, and the calcium sulfate precipitates. Upon heating the dried precipitate the silver chlorid volatilizes and passes off and is collected. As the ore will be thoroughly oxidized in the furnace, any metal values remaining in the furnace will be readily recovered.

Having now described our invention, what we claim, and desire to secure by Letters Patent, is—

The art of treating ores containing metalloids which consists in roasting the ore with access of air and agitation but shut off from the products of combustion, until an oxid of the metalloid is formed and passes off, together with the metal in the ore in a finely-divided state, collecting the fumes arising from the ore, in a receptacle containing a solution of a chlorid of an alkaline or alkaline-earth metal and converting in said receptacle, the oxid of the metalloid into an acid, and replacing the hydrogen of the acid with the alkaline or alkaline-earth metal, and setting free nascent chlorin, and forming a chlorid therewith of the metal values, in a finely-divided state substantially as described.

In testimony whereof we affix our signatures in presence of two witnesses.

ROBERT McKNIGHT.
MOSES SATARASKY.

Witnesses:
  GEO. W. REED,
  F. E. STEBBINS.